Patented Dec. 2, 1952

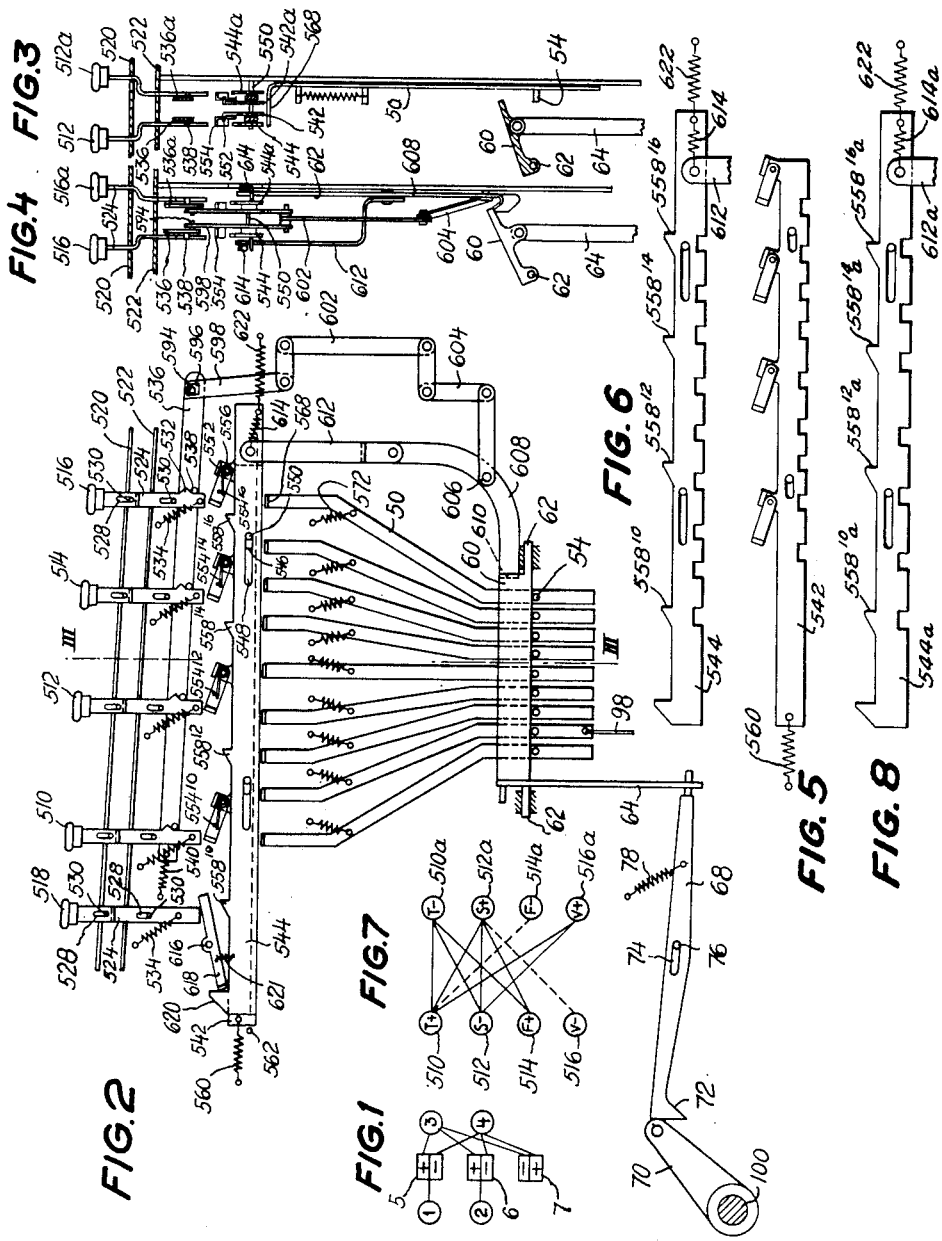

2,620,129

UNITED STATES PATENT OFFICE 2,620,129

PLURAL TOTALIZER SELECTING MECHANISM

Nils Henry Börje Kristenson, Stockholm, and Sven Johan Edvard Grähs, deceased, late of Stockholm, Sweden, by Per Olof Södermark, administrator, Stockholm, Sweden, assignors to Aktiebolaget Ekonomiregister, Stockholm, Sweden, a corporation of Sweden Application July 30, 1947, Serial No. 764,740
In Sweden November 13, 1939

Section 1, Public Law 690, August 8, 1946
Patent expires November 13, 1959

5 Claims. (Cl. 235—60)

The present invention relates to machines for book-keeping, statistical and similar purposes comprising a number of totalizers, in which a selector mechanism selects those two or more totalizers that correspond to a certain calculating operation and in balancing totalizers determines their sense of calculation (addition or subtraction).

Primarily, the invention consists in an improvement of the machine described in the U. S. patent specification No. 2,277,250, in which the selector mechanism is controlled by a number of so-called analyzing keys corresponding to various business transactions, or by a single such key adapted to be set in positions corresponding to different business transactions, the totalizers being connected with the analyzing key or keys in such a manner that, when the analyzing key is set in a certain position or a certain analyzing key is depressed, always the same two totalizers representative of the business transaction in question and, if desired, also one or more other totalizers are prepared to be actuated. Therefore, according to said specification, the operator will first have to analyze the business transaction in question as to its character and then to depress the corresponding analyzing key or set the analyzing key in a corresponding position, the number of setting operations necessary for simultaneous control of several totalizers being reduced to a single one, the selection of which however requires human thought activity.

In machines of said kind the registration of a debit item and a corresponding credit item is made simultaneously, and it is also usual to register designations of the two accounts debited and credited.

The object of the invention is to provide a device by means of which the control of the totalizers is effected in such a manner that the operator is relieved of having to select a certain totalizer-controlling analyzing key according to judgement.

Another object is to provide auxiliary means making it possible either to facilitate the thought work of the operator in analyzing the business transaction under consideration and thereby wholly or partly to cut out fault sources due thereto, or completely to cut out the thought act of the operator necessary for analyzing the business transaction.

Still another object of the invention is to provide a machine which is automatic to a high extent and which is simple and reliable in operation.

The invention will be described in the following in its application in book-keeping machines, it being understood, however, that it is not restricted to this field of application but has a general application in all machines having totalizers, in which two or more balancing totalizers are to be put into operation simultaneously.

The invention will be more closely described with reference to the accompanying drawing. Fig. 1 shows a diagrammatic representation of a book-keeping machine according to the invention, provided with four setting keys. Fig. 2 is a lateral view of a key-board in a machine according to the invention. Fig. 3 is a cross-sectional view taken along the line III—III in Fig. 2. Fig. 4 is a view taken from the right in Fig. 2. Figs. 5 and 6 are detailed views of a selector bar and a lock bar cooperating therewith, respectively. Fig. 7 is a diagram of the machine shown in Figs. 2–6, and Fig. 8 is a detailed view of a second selector bar.

The embodiment shown in the drawing is an improvement of the embodiment described in the U. S. patent specification No. 2,277,250 with reference to Figs. 2–14, and is identical or similar thereto as to all details regarding which it does not appear from the following description that a difference exists.

Referring to Fig. 1, the numerals 1, 2, 3 and 4 designate four setting keys and 5, 6 and 7 three balancing totalizers. The key 1 may for instance represent cash transaction, key 2 credit transactions, key 3 own debitings and key 4 own creditings. The totalizer 5 may represent the cash, totalizer 6 the day book and totalizer 7 the account-current book. For instance, if a customer has made a purchase on credit, this is registered by first depressing the key 2, the totalizer 6 being selected, and then depressing the key 4, whereby the sense of calculation of this totalizer will be determined as subtraction and also the totalizer 7 will be selected for addition. The work of the operator may be facilitated thereby, that cards representing the accounts in question, viz. in this case the debit day book and the credit account of the customer or the credit side of the account card of the customer, are marked "2" and "4," respectively, or thereby that said cards or keys are marked concordantly in any other way.

In the embodiment shown in Figs. 2–6, the keyboard of the machine comprises two rows having each four setting keys respectively designated 510, 512, 514 and 516 and 510a, 512a, 514a and 516a (the keys 512a and 516a of the second row being visible in Figs. 3 and 4) and a releasing key 518. Each setting key consists of shank 524 guided in an upper plate 520 and a lower plate 522 and is provided with guide slots 528 engaged by transversely disposed rods 530 mounting the shank for vertical movement. At its side the shank 524 is provided with a projection 532. A spring 534 strives to keep the key in its upper position.

For each key row there is provided a longitudinally displaceable catch bar 536, 536a, which for each key, except the release key 518, has a pin 538 cooperating with the projection 532. Springs 540 urge the catch bars 546 and 536a to the left to press the pins 538 in contact with the key shanks 524.

Arranged below each catch bar 536, 536a is an inner lock bar 542, 542a and an outer selector bar 544, 544a. The inner lock bars 542, 542a are provided with longitudinal slits of a comparatively small length and the outer selector bars are provided with corresponding slots 548 of a greater length, said slots being engaged by guiding pins 550 attached to the frame work. Journalled on pins 552 on each inner bar 542, 542a are four arms $554^{10}$, $554^{12}$, $554^{14}$ and $554^{16}$, one for each setting key, which arms are held in their up-swung position by springs 556. On their upper side the outer selector bars 544, 544a have four projections $558^{10}$, $558^{12}$, $558^{14}$ and $558^{16}$ adapted to cooperate with the arms 554. In their initial position said projections are located at a distance from the corresponding arms which increases towards the left. A spring 560 normally holds each of the inner bars 542, 542a in contact with a stop pin 562. In the lower edge of the two inner and two outer bars there are a series of notches 564, 566.

Against the lower edge of the bars 542, 542a and 544, 544a bear the upper bent ends 568 of a series of releasing bars 50, said bent ends extending across all four bars. Each is urged upwards by a spring 572 and provided with an abutment pin 54 at its lower end. By means of transmission means these bars are in different combinations connected to the totalizers of the machine in the manner described and shown in the U. S. patent specification No. 2,277,250. In the initial position the notches 564 of the inner bars 542, 542a are so positioned in relation to the bent ends 568 of the releasing bars 50 that the latter are locked, by the unnotched portions of the bars, against displacement upwardly. If however the bars 542, 542a are displaced a distance equal to the length of the guide slots 546, as will be described in the following, the notches 564 will take up a position opposite said bent ends 568, so that the releasing bars 50 are released, said upper bent ends 568 being able to move upwards into said notches 564. Located above the abutment pins 54 is a restoring bar 60 normally disengaged from said abutment pins, which bar is journalled in the framework at 62 and pivoted to a link 64, into the free end of which projects one end of a lever 68. Said lever is influenced by a spring 78 and cooperates by means of an abutment face 72 at its other end, with an arm 70 attached to the drive shaft 100 of the machine. Approximately at its center the lever 68 is provided with a longitudinal slot 74 engaged by a pin 76 which is attached to the framework and about which the lever rocks.

The lower ends of the selector bars 50 are connected to means shown in Fig. 3 of the U. S. specification No. 2,277,250 whereby certain combinations of totalizers are thrown in at the actuation of the selector bars, each selector bar corresponding to a different combination of totalizers. The front end of each catch bar 536, 536a carries a pin 594 engaging a slot 596 in the upper end of a link 598. By means of a link system 602, 604 the lower ends of these links 598 are pivotally connected to the frame work at 606. Pivoted about the same pivot 606 is a curved link 608, the lower end of which is bent at 610 and adapted to be influenced by the restoring bar 60 and the upper end of which is divided into two links 612, 612, the ends of which extend on the outside of each outer selector bar 544, 544a. A spring 614 connects each link to the corresponding bar.

The releasing key 518 is constructed in the same way as the setting keys, i. e. it is provided with a key-shank 524, slots 528 for guide rods 530, and a spring 534. With its lower end it cooperates with a catch 618 pivoted in the framework at 616 and influenced by a spring 621. Normally this catch bears against an abutment 620 at the rear end of the outer bars 544, 544a. A spring 622 attached to the front end of each outer bar 544, 544a strives to keep the abutment 620 in contact with the catch 618.

The selector mechanism shown in Figs. 2–6 will be more closely explained with reference to the diagram shown in Fig. 7 relating to a machine constructed to operate in accordance with the accounting method described in the U. S. patent specification No. 2,277,250 (see page 1, column 1, line 39, through column 2, line 50). The keys 510, 512, 514 and 516 represent in order the debit items: increases of assets (T+), decrease of liabilities (S—), increase of losses (F+) and decrease of profits (V—), whereas the keys 510a, 512a, 514a and 516a represent in order the credit items: decrease of assets (T—), increase of liabilities (S+), decrease of losses (F—) and increase of profits (V+). Theoretically these eight keys may be combined into pairs in sixteen different ways, but of these essentially eight combinations are of practical importance, viz. T+ T—, T+ S+, T+ V+, S— T—, S— S+, S— V+, F+ T— and F+ S+. In correspondence herewith the machine is provided with eight releasing bars 50 which in order from the left to the right correspond to said eight combinations. In addition thereto, there is provided to the extreme right a ninth releasing bar forming a reserve for still another combination necessary only in rare cases, and which might represent, for example, the combination V— S+.

As an example it is supposed, that a business transaction corresponding to the combination of an increase of assets and an increase of liabilities, i. e. T+ S+, is to be registered in the machine. The corresponding account cards may have the same designation, the same color etc. as the keys 510 and 512a, and therefore the operator need not analyze the business transaction more than necessary to ascertain the keys that in the respect in question correspond to the cards.

Depression of the key 510 swings down the arm $554^{10}$ on the bar 542, so that the arm comes into the path of the corresponding projection $558^{10}$ on the selector bar 544. When this bar 544 is released in a manner to be described later on, it will therefore move to the right in Fig. 2 a distance corresponding to the distance between the projection $558^{10}$ and the arm $554^{10}$. As already has been mentioned, the distances between the projections 558 and the corresponding arms 554 are of a gradually different length, so that the bar 544 will be displaced a different distance by the depression of different setting keys. After this displacement of the bar 544 the notches 566 in the lower edge thereof lie opposite to such releasing bars 50 as correspond to combinations to which the totalizer representing increase of the assets or the additive side of the balancing assets totalizer belongs, i. e. in this case the three notches 566 from the left end of the bars 544 face the three bars 50 to the extreme left. Therefore, after its displacement the bar 544 for its part allows any of these four releasing bars 50 to be displaced upwardly under the influence of the springs 572 the remaining releasing bars 50 facing unnotched portions of bar 544 and being thus prevented from moving upward. Similarly, when the key 512a (Fig. 3) is depressed, the arm 554$^{12a}$ (Fig. 5) enters into the path of the corresponding projection 558$^{12a}$ (Fig. 8), so that after the displacement of the bar 544a (Fig. 8), some of the notches 566 in the lower edge thereof will lie opposite to such releasing bars as correspond to combinations, to which the totalizer representing increase of liabilities or the additive side of the balanced liabilities totalizer belongs, i. e. in this case the second, the fifth, the eighth and the ninth bar counted from the left in Fig. 2. Thus, after its displacement the bar 544a for its part allows any of the thus selected bars to be displaced upwardly under the influence of the spring 572 the remaining releasing bars 50 facing unnotched portions of bars 544a and being thus prevented from moving upwards. However, only one releasing bar, viz. the second one, is released by both bars 544 and 544a and therefore only this bar can be displaced and select the corresponding combination of totalizers.

If the releasing bars are numbered 1, 2, 3, 4, 5, 6, 7, 8 and 9 from the left in Figure 2, in the example related above the depression of key 510 will select the releasing bars 1, 2, 3, and the depression of key 512a will select the releasing bars 2, 5, 8, and 9. These two keys together thus select only the second releasing bar from the left and thereby the totalizer combination corresponding to T+, S+.

In a similar manner the depression of key 512 will permit a displacement of the bar 544 to a position in which the releasing bars No. 4, 5 and 6 from the left are faced by notches 566 and the depression of key 510a will select the releasing bars 1, 4 and 7, so that keys 512 and 510a in combination select the fourth releasing bar from the left and thus the combination of totalizers corresponding to S—, T—. The arrangement of the notches on the racks 566 and 566a and the different distances by which the racks are displaced when depressing the different keys 510—516, 510a—516a is such that any of the keys 510—516 will select a different group of releasing bars 50 by different displacements of the rack 544, and that any of the keys 510a—516a in the other row of keys will select a different group of releasing bars 50 having only one releasing bar 50 in common with any one of the groups selected by the keys 510—516, so that any combination of two keys belonging each to one of the two rows of four keys will select only one releasing bar 50 corresponding to the desired combination of totalizers.

In the embodiment shown the release of the selector bars 544, 544a is performed by depressing the releasing key 518, the bars 544, 544a, being moved by the spring 622 in the manner described above, when the catch 618 is released. The last part of the displacement moves the bars 542, 542a a small distance corresponding to the length of the guide slits 546 against the action of the springs 560 which are weaker than the springs 622, notches 564 in the lower edge of these bars 542, 542a being brought opposite to all releasing bars 50, which thereby are free to move upwards. As all releasing bars 50 except the second one from the left in Fig. 2 are prevented from moving by either the bar 544 or the bar 544a, only this releasing bar will be displaced upwardly.

The setting device is restored to its initial position in the following manner. At the end of the return stroke of the drive shaft 100 the arm 70 which is fixed to said shaft and during the forward stroke has been brought out of engagement with the lever 68, swings upwardly against the abutment face 72 and turns the lever 68 clockwise, so that its end which engages the link 64, is lowered and the restoring bar 60 is turned into engagement with the abutment pin 54 on the second releasing bar 50 displacing the same downwardly to its initial position against the influence of its spring 572. The restoring bar 60 also strikes the bent part 610 of the link 608 swinging the same anticlockwise, and by means of the links 612 and the springs 614 moves the bars 544, 544a and via these also the bars 542, 542a to the left. It is to be noted, that the springs 614 are stronger than the springs 622. At the end of the movement the catch 618 swings-in in front of the abutment 620 and locks the bars 544, 544a in their initial position, in which all releasing bars 50 are prevented to move upwardly by the bars 542, 542a. Simultaneously the catch bars 536, 536a are moved to the right in Fig. 2 by means of the link system 604, 602, 598, whereby the depressed keys 510, 512a are released and returned to their initial position under the action of their springs 534.

In motor driven machines the releasing lever 618 described above and shown in the drawing serves also to initiate operation of the motor. The invention is not restricted to the embodiment described above and shown in the drawing but may be modified within the limits of the following claims.

What we claim is:

1. In a bookkeeping machine comprising a plurality of totalizers, a plurality of totalizer conditioning means each operable to simultaneously condition at least two totalizers for simultaneous operation and to condition the selected totalizers for their sense of calculation, each said conditioning means initiating preparation for operation of a fixed combination of totalizers different from all others, two sets of keys each comprising a plurality of keys having specific numeral values, a pair of bars associated with each set of keys, one of said bars of each group being a selector bar and the second bar a locking bar, movable abutments carried on said locking bars and displaceable by said keys, fixed abutments on said selector bars cooperating with said movable abutments, said selector bars being provided along their lower edges with notches adapted to receive said conditioning means, said notches being arranged so that upon movement of said bars through any particular combinations of steps a single conditioning means is in position to enter aligned notches in said two selector bars, said locking bars being provided with notches along their lower edges, said notches being normally displaced by a small step of movement from the position of alignment with said conditioning means, and means for releasing said selector bars to thereby permit displacement of said bars in accordance with the operated keys one from each group of keys, and to permit the locking bars to move through said small step of movement to thereby present aligned notches in said selector bars and said locking bars to one only of said conditioning means.

2. In a bookeeping machine comprising a plurality of totalizers, a plurality of totalizer conditioning means each operable to simultaneously condition at least two totalizers for simultaneous operation and to condition the selected totalizers for their sense of calculation, each said conditioning means initiating preparation for operation of a fixed combination of totalizers different from all others, two sets of keys each comprising a plurality of keys having specific numeral values, a pair of bars associated with each set of keys, one of said bars of each group being a selector bar and the second bar a locking bar, movable abutments carried on said locking bars and displaceable by said keys, fixed abutments on said selector bars cooperating with said movable abutments, said selector bars being provided along their lower edges with notches adapted to receive said conditioning means, said notches being arranged so that upon movement of said bars through any particular combination of steps a single conditioning means is in position to enter aligned notches in said two selector bars, said locking bars being provided with notches along their lower edges, said notches being normally displaced by a small step of movement from the position of alignment with said conditioning means, means for releasing said selector bars to thereby permit displacement of said bars in accordance with the operated keys one from each group of keys, and to permit the locking bars to move through said small step of movement to thereby present aligned notches in said selector bars and said locking bars to one only of said conditioning means, means urging said conditioning means into said aligned notches, and means normally preventing said movement into said notches, said preventing means being operable with said releasing means to permit movement of said conditioning means into the said notches.

3. In a bookkeeping machine comprising a plurality of totalizers, a plurality of totalizer conditioning means each operable to simultaneously condition at least two totalizers for simultaneous operation and to condition the selected totalizers for their sense of calculation, each said conditioning means initiating preparation for operation of a fixed combination of totalizers different from all others, two sets of keys each comprising four keys, having numerical values of from one to four, a pair of bars associated with each set of keys, one of said bars of each group being a selector bar and the second bar a locking bar, movable abutments carried on said locking bars and displaceable by said keys, fixed abutments on said selector bars cooperating with said movable abutments, said selector bars being provided along their lower edges with notches adapted to receive said conditioning means, said notches being arranged so that upon movement of said bars through any particular combinations of steps a single conditioning means is in position to enter aligned notches in said two selector bars, said locking bars being provided with notches along their lower edges, said notches being normally displaced by a small step of movement from the position of alignment with said conditioning means, and means for releasing said selector bars to thereby permit displacement of said bars in accordance with the operated keys one from each group of keys, and to permit the locking bars to move through said small step of movement to thereby present aligned notches in said selector bars and said locking bars to one only of said conditioning means.

4. In a bookkeeping machine comprising a plurality of totalizers, a plurality of totalizer conditioning means each operable to simultaneously condition at least two totalizers for simultaneous operation and to condition the selected totalizers for their sense of calculation, each said conditioning means initiating preparation for operation of a fixed combination of totalizers different from all others, two sets of keys each comprising four keys having numerical values of from one to four, a pair of bars associated with each set of keys, one of said bars of each group being a selector bar and the second bar a locking bar, movable abutments carried on said locking bars and displaceable by said keys, fixed abutments on said selector bars cooperating with said movable abutments, said selector bars being provided along their lower edges with notches adapted to receive said conditioning means, said notches being arranged so that upon movement of said bars through any particular combinations of steps a single conditioning means is in position to enter aligned notches in said two selector bars, said locking bars being provided with notches along their lower edges, said notches being normally displaced by a small step of movement from the position of alignment with said conditioning means, means for releasing said selector bars to thereby permit displacement of said bars in accordance with the operated keys one from each group of keys, and to permit the locking bars to move through said small step of movement to thereby present aligned notches in said selector bars and said locking bars to one only of said conditioning means, means urging said conditioning means into said aligned notches, and means normally preventing said movement into said notches, said preventing means being operable with said releasing means to permit movement of said conditioning means in the said notches.

5. In a bookkeeping machine comprising a plurality of totalizers, a plurality of totalizer conditioning means each operable to simultaneously condition at least two totalizers for an operation, and to condition certain of said totalizers for a particular sense of calculation, each conditioning means corresponding to a fixed combination of totalizers different from the others, two sets of keys each comprising a plurality of keys and a selector mechanism operable in accordance with the operation of two of said keys, one from each of said two sets to select one of said conditioning means, said selector mechanism comprising two groups of displaceable bars in each of which groups one bar is displaceable a distance corresponding to the numeral value of the operated key associated therewith, the displaced bar of one of said two groups selecting the conditioning means for a group of said totalizers and the displaced bar of said second group selecting a single conditioning means from said selected group of said conditioning means, the displacement of each of said numerically displaceable bars being determined by the operation of movable abutments pivotally mounted on the other bar of the same group, and movable into the path of fixed abutments on the numerically displaceable bars.

NILS HENRY BÖRJE KRISTENSON.
PER OLOF SÖDERMARK,
*Administrator of the Estate of Sven Johan Edvard Grähs, Deceased.*

REFERENCES CITED

The following references are of record in the file of this patent:

UNITED STATES PATENTS

| Number | Name | Date |
|---|---|---|
| 2,057,606 | Campos | Oct. 13, 1936 |
| 2,142,346 | Breitling | Jan. 3, 1939 |
| 2,277,250 | Nyberg | Mar. 24, 1942 |
| 2,376,481 | Gubelmann | May 22, 1945 |